United States Patent Office 2,950,650
Patented Aug. 30, 1960

2,950,650

VERTICAL ILLUMINATOR

Walter Klein, Wissmar uber Wetzlar (Lahn), Germany, assignor to Ernst Leitz, G.m.b.H., Wetzlar (Lahn), Germany Filed Oct. 4, 1955, Ser. No. 538,500

Claims priority, application Germany Oct. 9, 1954

6 Claims. (Cl. 88—40)

The present invention relates to microscopes and more particularly to vertical illuminators of the type employed in microscopic examination by reflected light.

For certain purposes, and particularly in the field of metallurgical microscopy, it is sometimes desirable to provide survey photographs of general features of specimens in approximately natural size. This requires a sufficiently large and evenly illuminated object field which cannot be obtained by conventional vertical illuminators. Accordingly, a principal object of the present invention has been to provide a vertical illuminator for use with small magnification ratios and which will illuminate a large object field.

A feature of the invention has been the provision of an illuminator of the above type which will create on the object an enlarged illuminated field.

Other and further objects, features and advantages of the invention will appear more fully from the following description of the invention.

In accordance with the invention, there are provided, as a modification of the Koehler illuminating system, a positive field lens placed close to the object, a transparent reflector between the object and a low-power microscope or photographic objective, and a negative lens which is placed close to the said reflector, whereby the negative lens, together with the field lens, forms a tele-lens-system. In addition, a positive lens is placed close to the aperture diaphragm of the Koehler system. The said negative lens may be placed either between the aperture diaphragm and the reflector or between the reflector and the field lens.

Figure 1:
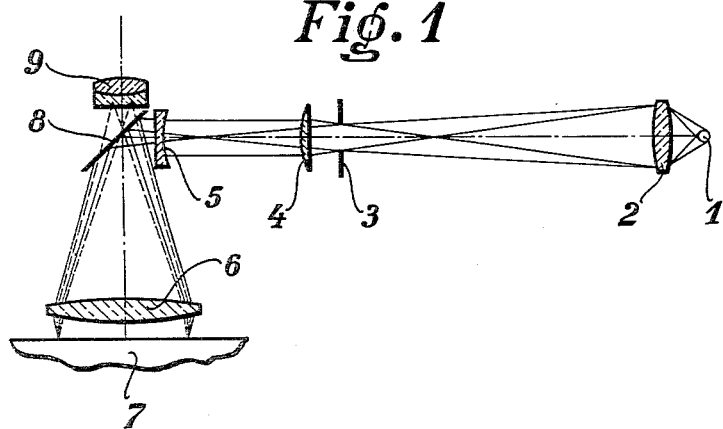
Figure 2:
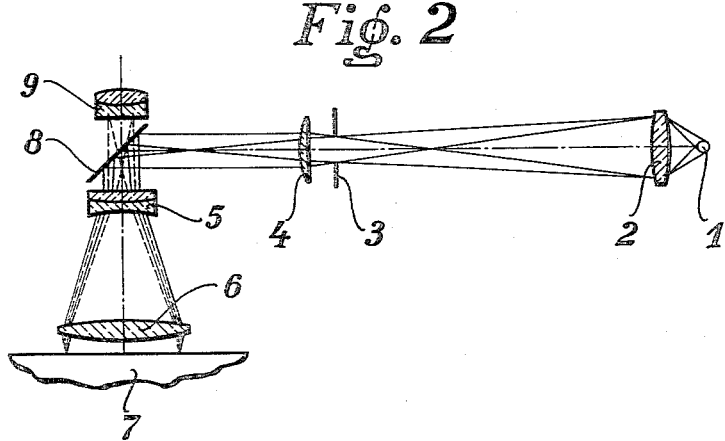

The invention will now be described in greater detail with reference to the appended drawing, in which:

Fig. 1 is a schematic representation of one form of illuminator construction according to the invention and in which the negative lens is placed between the Koehler aperture diaphragm ad the reflector; and Fig. 2 is a schematic representation of another form of illuminator according to the invention and in which the negative lens is placed between the reflector and the field lens.

Referring now to the drawing and more particularly to Fig. 1, the reference numeral 1 refers to a source of light which might be, for example, a lamp. An image of the lamp 1 is formed by a collector lens 2 in a plane near the aperture diaphragm 3. An image of said collector lens is formed in the object plane 6 by light passing through the lenses 4 and 5 and the field lens 6. The lenses 5 and 6 form a tele-lens-system. Between the lenses 5 and 6 there is provided a transparent reflector 8 which might be a thin plane glass plate of the type commonly employed in vertical or incident illuminating systems. The reflector 8 passes some light which is then lost, and reflects some light through the field lens 6 onto the object 7. The field lens 6 causes the illuminating principal rays to be arranged in parallel, thus creating on the object 7 an extended illuminated field which is sharply limited by the edge of the field lens.

Light reflected from the illuminated field of the object 7 is focused in a low-power objective lens 9, after passing once more the field lens and reflector 8. The remaining parts of the microscope may be constructed in the usual manner to produce an image for visual observation or photography of the illuminated field of the object 7. As will be evident from the drawing, the location of the negative lens 5 near the reflector 8 has the advantage of permitting the use of a small size plate for the reflector since the pencil of light rays at this point will be relatively narrow.

The arrangement of Fig. 2 is similar to that of Fig. 1, and the various parts are designated with the same reference numerals. The difference between Fig. 1 and Fig. 2 lies in the location of the negative lens 5. In Fig. 1, this negative lens is located between the Koehler aperture diaphragm and the reflector 8, while in Fig. 2, the negative lens 5 is located between the reflector 8 and the field lens 6. In this latter arrangement, the negative lens 5 participates in the production of the image of the object and should be included in the optical correction of the objective lens 9 as a whole.

While the invention has been described in connection with particular embodiments thereof and in particular uses, various modifications thereof will occur to those skilled in the art without departing from the spirit and scope of the invention as set forth in the appended claims.

What is claimed is:

1. Apparatus of the vertical illuminator type for illuminating a large field of an object and creating an image of said field to an objective lens system, comprising a source of light, a collector lens, an aperture diaphragm disposed near the place of the image of the said source of light created by said collector lens, a positive lens adjacent said diaphragm, a transparent reflector arranged to direct a beam of light from said source onto said object, a positive field lens disposed in the path of said beam between said reflector and said object and being located near said object, and a negative lens located in the path of said beam of light between said diaphragm and said positive field lens, said negative lens, together with said positive field lens forming a tele-lens-system for focusing said beam of light on said object and illuminating an object-field limited by the edge of the field lens whereby light reflected from said object-field passes through said reflector, and an objective lens for creating an image of said field.

2. Apparatus as set forth in claim 1 in which the negative lens is located between the aperture diaphragm and the reflector.

3. Apparatus as set forth in claim 1 in which the negative lens is located between the reflector and the positive field lens.

4. In apparatus of the vertical illuminator type for microscopes, the combination comprising an objective lens, a source of light, a collector lens, a transparent reflector arranged to direct a light beam from said source onto an object, an aperture diaphragm forming a part of a Koehler illuminating system and being disposed in the path of light between said source and said reflector, a positive lens located in the path of said beam of light near said diaphragm, a positive field lens located in the path of said light beam between said reflector and said object and being located close to said object, a negative lens optically adjacent to said reflector and in the path of said light beam between said diaphragm and said positive field lens, said negative lens, together with said positive field lens forming a tele-lens-system for focusing said beam of light on said object and illuminating an object-field limited by the edge of said field lens whereby light reflected from said field of said object and focused by said positive field lens passes through said reflector and said objective lens creating an image of the said object.

5. The combination set forth in claim 4 in which the negative lens is located between the aperture diaphragm and the reflector.

6. The combination set forth in claim 4 in which the negative lens is located between the reflector and the positive field lens and assists the objective lens in creating said image of said object.

References Cited in the file of this patent

UNITED STATES PATENTS

| | | |
|---|---|---|
| 2,349,457 | Osterberg et al. | May 23, 1944 |
| 2,543,354 | Cook | Feb. 27, 1951 |

FOREIGN PATENTS

| | | |
|---|---|---|
| 16,004 | Great Britain | of 1913 |
| 718,440 | Great Britain | Nov. 17, 1954 |